United States Patent
Tubouchi et al.

(10) Patent No.: US 9,584,050 B2
(45) Date of Patent: Feb. 28, 2017

(54) MOTOR DRIVE DEVICE AND BRUSHLESS MOTOR EQUIPPED WITH SAME, AND AIR CONDITIONER

(71) Applicant: Panasonic Intellectual Property Management Co., Ltd., Osaka (JP)

(72) Inventors: Toshiki Tubouchi, Osaka (JP); Tomoya Hosokawa, Osaka (JP); Yasushi Kato, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/654,548

(22) PCT Filed: Dec. 10, 2013

(86) PCT No.: PCT/JP2013/007252
§ 371 (c)(1),
(2) Date: Jun. 22, 2015

(87) PCT Pub. No.: WO2014/103205
PCT Pub. Date: Jul. 3, 2014

(65) Prior Publication Data
US 2015/0357947 A1    Dec. 10, 2015

(30) Foreign Application Priority Data
Dec. 27, 2012 (JP) ................. 2012-284189

(51) Int. Cl.
*H02P 6/04* (2016.01)
*H02P 6/16* (2016.01)

(52) U.S. Cl.
CPC ............ *H02P 6/16* (2013.01); *H02P 6/153* (2016.02); *H02P 6/17* (2016.02)

(58) Field of Classification Search
CPC ............ H02P 6/08; H02P 6/153; H02P 25/03; H02P 29/0038; H02M 1/12
See application file for complete search history.

(56) References Cited

U.S. PATENT DOCUMENTS

| | | | |
|---|---|---|---|
| 2004/0007998 A1 | 1/2004 | Yasohara et al. | |
| 2006/0012324 A1* | 1/2006 | Eskritt | B62D 5/065 318/437 |

FOREIGN PATENT DOCUMENTS

| | | |
|---|---|---|
| JP | 2003-189666 | 7/2003 |
| JP | 2004-048951 | 2/2004 |

(Continued)

OTHER PUBLICATIONS

International Search Report of PCT application No. PCT/JP2013/007252 dated Mar. 11, 2014.

*Primary Examiner* — Karen Masih
(74) *Attorney, Agent, or Firm* — Hamre, Schumann, Mueller & Larson, P.C.

(57) ABSTRACT

A motor drive device of the present invention includes a speed signal generator that generates a rotation speed signal indicating rotation speed; a PWM signal generator that acts on the power switch unit to control the power switch unit so as to generate coil-applied voltage; and a phase advance information generator that has characteristic curve information representing changes of rotation speed of and load on a brushless motor, preliminarily set. The phase advance information generator generates phase advance information according to the load characteristic curve to variably control the phase advance (the phase of voltage applied to the coils of the brushless motor, relative to the induced voltage phase) according to the load characteristic curve.

9 Claims, 14 Drawing Sheets

(56) References Cited

FOREIGN PATENT DOCUMENTS

| | | |
|---|---|---|
| JP | 3713549 B | 11/2005 |
| JP | 2012-235571 | 11/2012 |

* cited by examiner

MOTOR DRIVE DEVICE AND BRUSHLESS MOTOR EQUIPPED WITH SAME, AND AIR CONDITIONER

CROSS-REFERENCE TO RELATED APPLICATIONS

This application is a U.S. national stage application of the PCT International Application No. PCT/JP2013/007252 filed on Dec. 10, 2013, which claims the benefit of foreign priority of Japanese patent application 2012-284189 filed on Dec. 27, 2012, the contents all of which are incorporated herein by reference.

TECHNICAL FIELD

The present invention relates to a motor drive device, particularly to a motor drive device that has a function of controlling the phase advance of voltage applied to the coil of a brushless motor and to a brushless motor including the motor drive device, and to an air conditioner.

BACKGROUND ART

For a brushless motor to efficiently generate torque, the induced voltage phase of the drive coil needs to well match the coil current phase. However, when the induced voltage phase of the drive coil is made to match the phase of coil-applied voltage, the coil current has a phase delayed from the induced voltage phase due to an armature reaction, which undesirably reduces the torque.

To solve such a problem, coil-applied voltage needs to have a phase advanced from the induced voltage phase, for which various methods have been developed. As an example, there is known a method in which the phase of a coil current is detected or estimated to control the phase advance amount of coil-applied voltage so that the current phase of the coil matches the induced voltage phase. (Refer to PTL 1 for example.)

Such a method is ideal to generate torque efficiently; however, it requires a current sensor for detecting a coil current. Another method in which a power supply current is detected using a shunt resistance, instead of a current sensor, to estimate the coil current phase causes a large estimated error or impossible estimation of the coil current phase depending on the load on the brushless motor, its inductance, and power supply voltage to it.

CITATION LIST

Patent Literature

PTL 1 Japanese Patent Unexamined Publication No. 2004-48951

SUMMARY OF THE INVENTION

A motor drive device of the present invention is intended to solve the above-described existing problem in an application where the load characteristic curve (indicates changes of the speed and the load torque of a motor for a blowing fan for example) can be preliminarily determined or predicted. To solve this problem, the motor drive device preliminarily determines the phase advance amount of coil-applied voltage from the load characteristic curve, and applies voltage according to the phase advance amount. The motor drive device operates in this way to match the phase of a current applied to the coil with the induced voltage phase, thereby generating torque efficiently.

The present invention is a motor drive device including a power switch unit that supplies power to multi-phase coils of a motor; and a control unit that on-off controls the power switch unit. The control unit includes a speed signal generator that generates a rotation speed signal indicating rotation speed; a PWM signal generator that acts on the power switch unit to control the power switch unit so as to generate coil-applied voltage; and a phase advance information generator that has the preset phase advance amount of coil-applied voltage corresponding to given speed, based on the load characteristics of the motor. The motor drive device is configured to apply voltage to multi-phase coils according to a phase advance signal from the phase advance information generator. Further, the phase advance amount is determined so as to match the induced voltage of the coils with the coil current phase.

With such a configuration, the induced voltage phase well matches the coil current phase, thereby efficiently generating torque.

The load characteristics are configured to determine the phase advance amount by approximating a curved line with multiple straight lines. Such a configuration simplifies the phase information generator when the phase advance information generator is implemented with semiconductor elements. Especially by approximating a curved line with two straight lines, the phase information generator can be simplified to a minimum when the phase advance information generator as a component is implemented with semiconductor elements.

As a result that the phase advance amount from the phase advance information generator is multiplied by a certain ratio according to an externally set signal, an optimum advance angle increasing ratio can be set in various modes of driving of a blowing fan.

Instead, configuration is preliminarily made such that the phase advance amount generated by the phase advance information generator is multiplied by a certain ratio according to an application of a blowing fan frequently used, and when an externally set signal is received, the ratio represented by the signal is prioritized to eliminate the need for the signal.

In this way, according to the drive device of a brushless motor of the present invention, as a result that the phase advance amount of coil-applied voltage is preliminarily determined from the load characteristic curve, and voltage is applied according to the phase advance amount, the phase of a current applied to the coil can be matched with the induced voltage phase, thereby efficiently generating torque.

DESCRIPTION OF EMBODIMENTS

First Exemplary Embodiment

Figure 1:
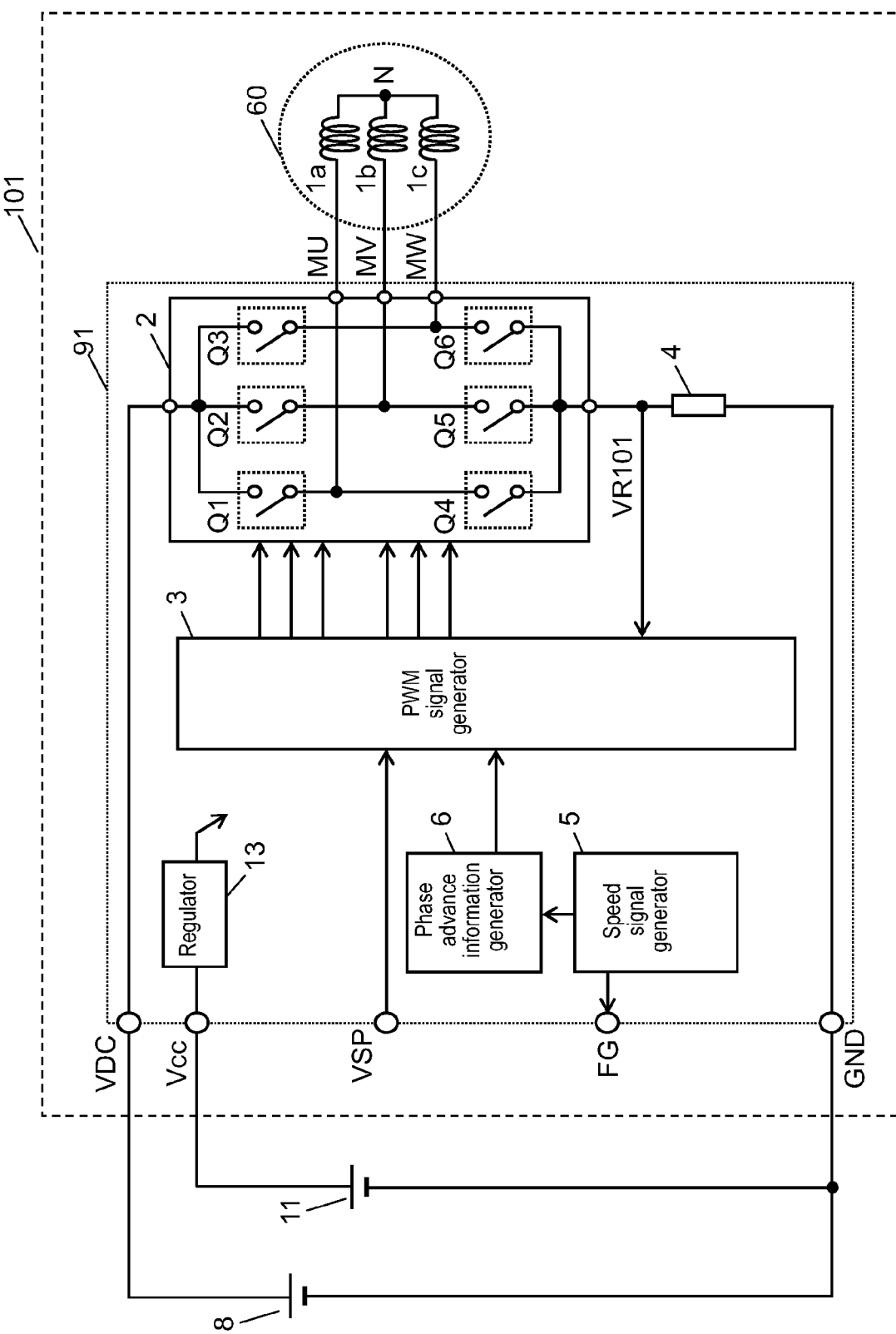
FIG. 1 is a block diagram illustrating the configuration of a brushless motor including a motor drive device according to the first exemplary embodiment of the present invention.

FIG. 1 is a block diagram illustrating the configuration of brushless motor 101 including motor drive device 91 according to the first exemplary embodiment of the present invention. In FIG. 1, brushless motor 101 is composed of motor drive device 91; and motor 60 including a stator and a rotor with coils 1a, 1b, and 1c wound therearound. Motor drive device 91 is configured to include power switch unit 2, PWM signal generator 3, shunt resistance 4, speed signal generator 5, and phase advance information generator 6. PWM signal generator 3, speed signal generator 5, and phase advance information generator 6 compose a control unit that on-off controls power switch unit 2.

Further, motor drive device 91 is provided with I/O terminals MU, MV, MW, VDC, and Vcc, and terminal GND. Terminals MU, MV, and MW are respectively connected with first coil 1a, second coil 1b, and third coil 1c. Terminals VDC and Vcc are respectively connected with the positive output of DC power supply 8 and the positive output of control power supply 11. Terminal GND is connected with the negative output of DC power supply 8 and control power supply 11.

In such a configuration, power switch unit 2 includes switch elements Q1 through Q6 to supply power to multiphase coils 1a, 1b, and 1c of motor 60. PWM signal generator 3 acts on power switch unit 2 to on-off control switch elements Q1 through Q6. More specifically, an extraneous motor-applied voltage instruction signal is input to PWM signal generator 3 through terminal VSP. Then, controlled by PWM signal generator 3, power switch unit 2 generates coil-applied voltage and applies the resulting voltage to first coil 1a, second coil 1b, and third coil 1c, which supplies power to the coils to generate torque.

Further, speed signal generator 5 generates a rotation speed signal indicating the rotation speed of brushless motor 101 from a signal indicating a rotating state of brushless motor 101 obtained from a magnetic sensor or optical sensor (both not shown), and provides the rotation speed signal to phase advance information generator 6. Here, the rotation speed signal indicates speed at which the rotor of motor 60 is actually rotating.

Phase advance information generator 6 has a phase advance amount of coil-applied voltage relative to given speed, preliminarily set as an advance angle value based on the load characteristics of brushless motor 101. Speed signal generator 5 provides a rotation speed signal to this phase advance information generator 6. Then, phase advance information generator 6 determines an advance angle value corresponding to the rotation speed signal received and outputs the resulting advance angle to PWM signal generator 3.

In other words, phase advance information generator 6 extracts an advance angle value preliminarily set by rotation speed according to speed indicated by the rotation speed signal, and provides the extracted advance angle value to PWM signal generator 3. Then, PWM signal generator 3 acts on power switch unit 2 so as to apply voltage having a phase advance corresponding to the advance angle value to the coils to advance the phase of voltage to be input to first coil 1a, second coil 1b, and third coil 1c. With such a configuration, the respective coils are electrically driven by applied voltage having a phase according to speed indicated by the rotation speed signal in this embodiment.

Figure 2:
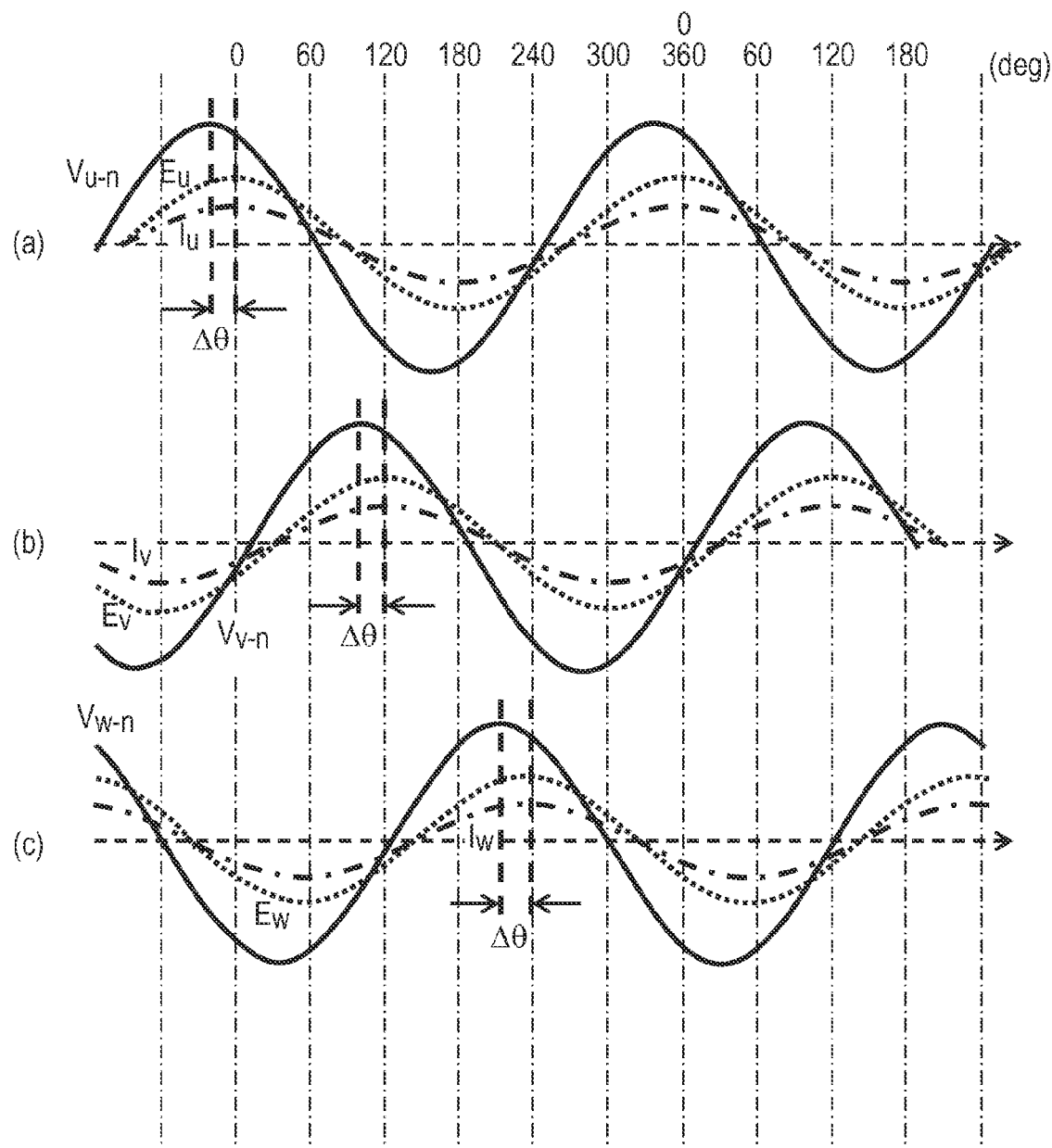
FIG. 2 illustrates the phase of the motor drive device of the brushless motor.

FIG. 2 illustrates phase relationship between induced voltages Eu, Ev, and Ew generated in first coil 1a, second coil 1b, and third coil 1c; applied voltages Vu-n, Vv-n, and Vw-n; and coil currents Iu, Iv, and Iw. In FIG. 2, the upper part shows first coil 1a; the middle part, second coil 1b; and the lower part, third coil 1c. Note that voltage applied to the coils has been pulse-width modulated (PWM) and averaged with neutral point N of the coils as a reference.

As shown in the upper part of FIG. 2, applied voltage Vu-n, which has a phase advanced by advance angle value $\Delta\theta$ relative to induced voltage Eu, is input to first coil 1a. Consequently, coil current Iu is generated with its phase matching that of induced voltage Eu. FIG. 2 as well shows an example where voltage that has a phase advanced by advance angle value $\Delta\theta$ is applied to second coil 1b in the middle part and to third coil 1c in the lower part.

In this embodiment, advance angle value $\Delta\theta$ (i.e., a phase advance amount) is thus set so that the phases of induced voltages Eu, Ev and Ew of coils 1a, 1b, and 1c match those of coil currents Iu, Iv, and Iw.

Figure 3A:
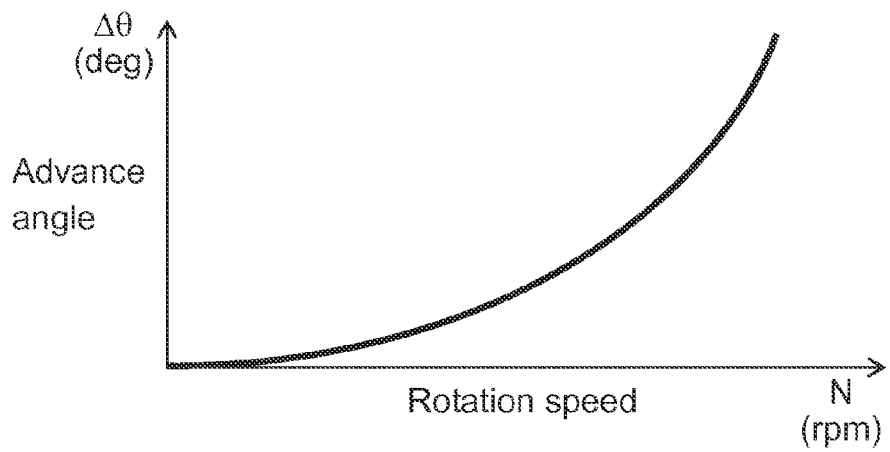
FIG. 3A illustrates operation of the motor drive device of the brushless motor.
Figure 3B:
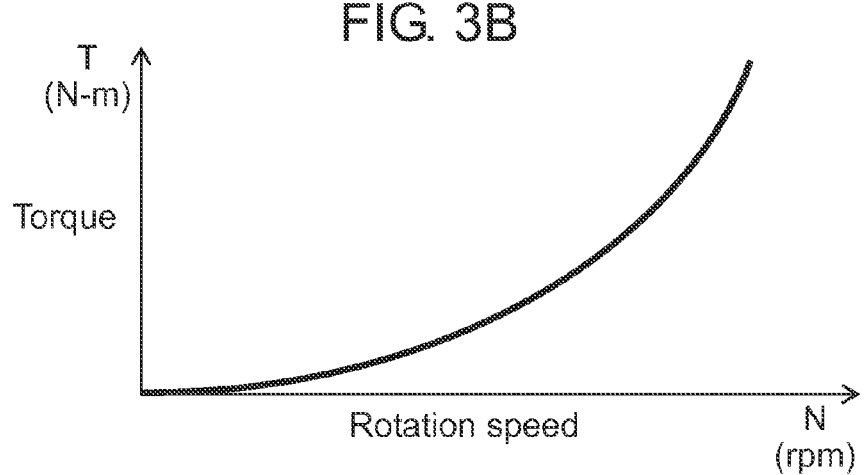
FIG. 3B illustrates operation of the motor drive device of the brushless motor.
Figure 3C:
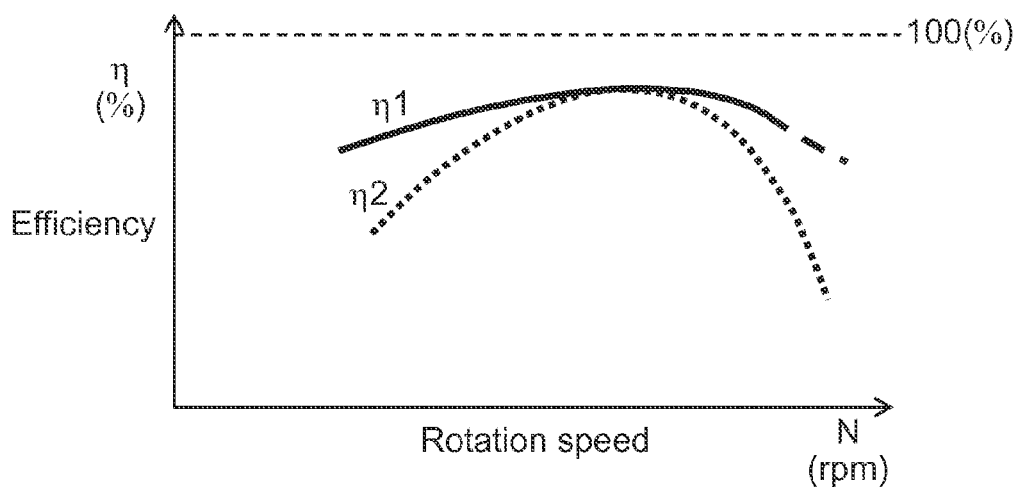
FIG. 3C illustrates operation of the motor drive device of the brushless motor.

FIG. 3A shows the relationship between rotation speed N and advance angle value $\Delta\theta$; FIG. 3B, between rotation speed N and torque T; and FIG. 3C, between rotation speed N and efficiency $\eta$. FIG. 3A shows the relationship between rotation speed N and advance angle value $\Delta\theta$ as an example of the load characteristics, where advance angle value $\Delta\theta$ increases proportionally to the ath power of N.

The above-described characteristics are expressed by the next expression.

$$\Delta\theta = A \times N^a + B \times N^{a-1} + C \times N^{a-2} + \ldots + K (\deg)$$

Here, A, B, C, a, and K are constants and are preliminarily set to values favorable for the range of the number of revolutions and a blowing fan actually used. This value of $\Delta\theta$ corresponding to rotation speed N is preliminarily set to phase advance information generator 6.

The advance angle characteristics described above are suitable for a load that increases the torque proportionally to the ath power of N as shown in FIG. 3B (e.g., a blowing fan that has load characteristics indicated by the load characteristic curve with a satisfying 1<a<3). Solid line η1 in FIG. 3C indicates an example where the advance angle value is variably controlled; and dotted line η2, an example where the advance angle value is not variably controlled. The efficiency characteristics of a brushless motor indicate that high efficiency can be maintained over a wide range of rotation speed as shown by solid line η1 in FIG. 3C.

Figure 4:
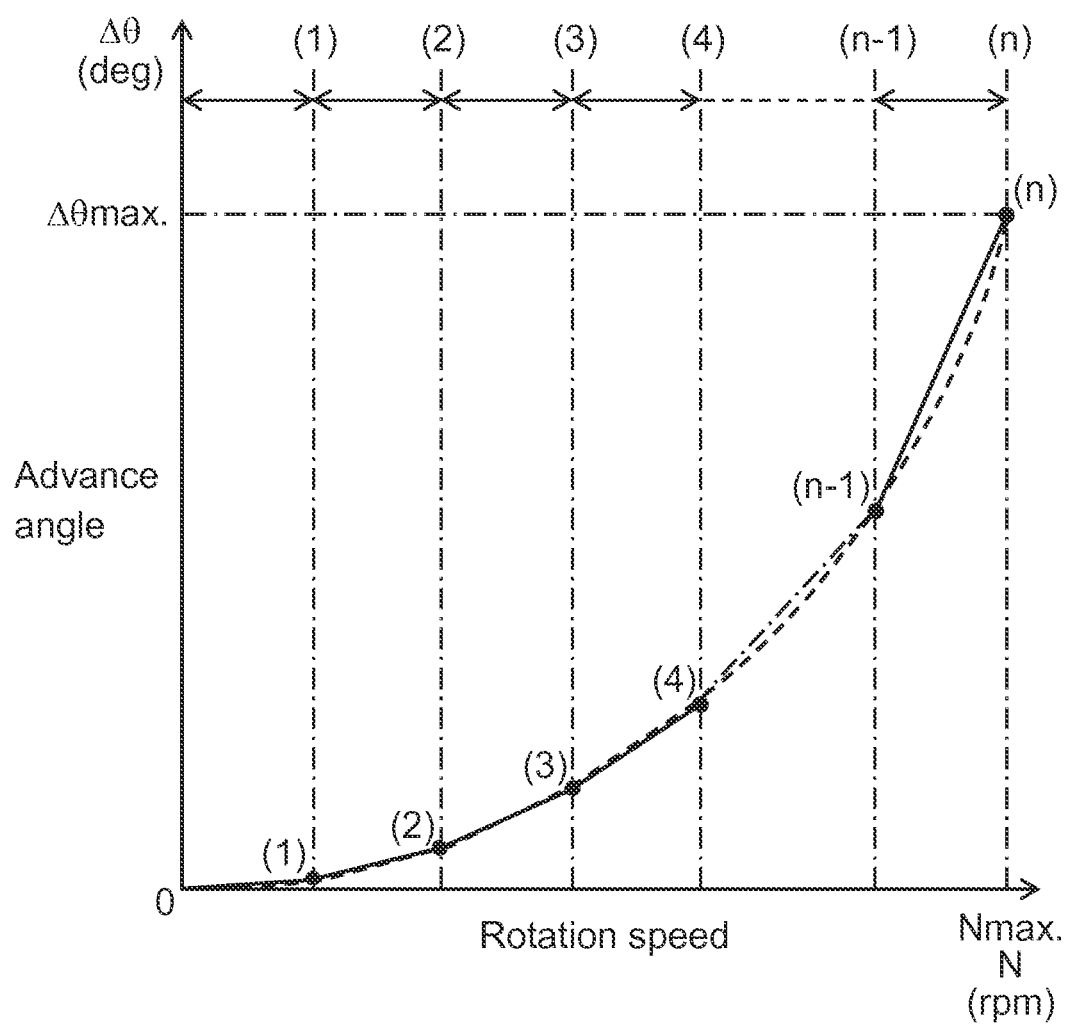
FIG. 4 illustrates operation of the motor drive device of the brushless motor.

Next, a description is made of operation related to phase advance information generator 6 of motor drive device 101 using FIG. 4. In FIG. 4, the broken line represents a quadratic curve as an example load characteristic curve. In this embodiment, advance angle value Δθ is set by the following way. That is, the load characteristic curve (the broken line) is divided n times from 0 to maximum rotation speed Nmax. Further, the division points: 0-(1), (1)-(2), (2)-(3), (3)-(4), . . . , (n–1)-(n) are connected with straight lines to approximate the load characteristic curve (the broken line) by a polygonal line with multiple vertices as shown by the solid line.

More division times approximate the polygonal with multiple vertices to the load characteristic curve (broken line) more closely; however, phase advance information generator 6 becomes more complicated and expensive. Thus, the number of divisions is set to a minimum that does not significantly decrease the efficiency of brushless motor 101.

Figure 5:
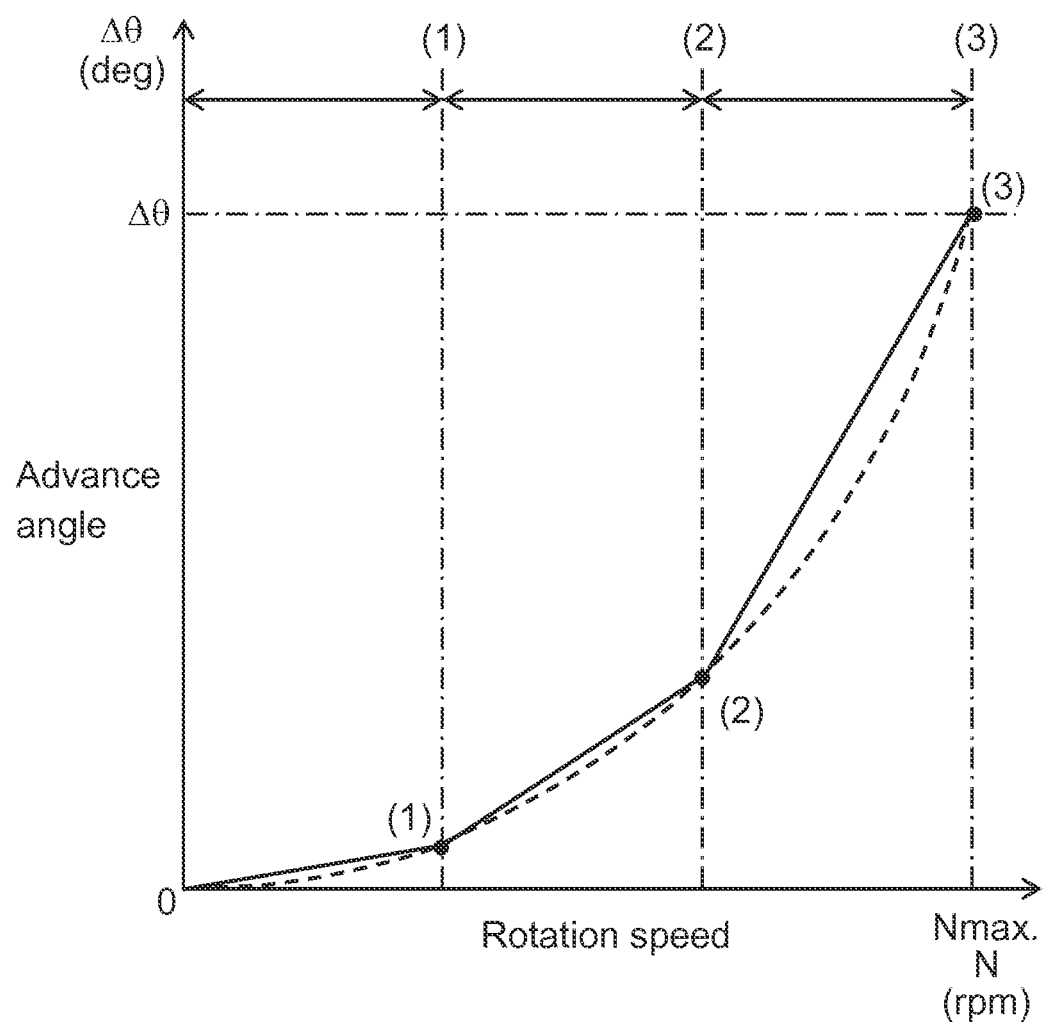
FIG. 5 illustrates operation of the motor drive device of the brushless motor.

In FIG. 5, the number of divisions in FIG. 4 is three to approximate the load characteristic curve (the broken line) to a polygonal line with two vertices (i.e., three straight lines) as shown by the solid line. Phase advance information generator 6 can be embodied with a less expensive, simpler configuration than that of FIG. 4.

Note that the curve is divided evenly in FIG. 5; however, the division ratio may be changed.

Second Exemplary Embodiment

Figure 6:
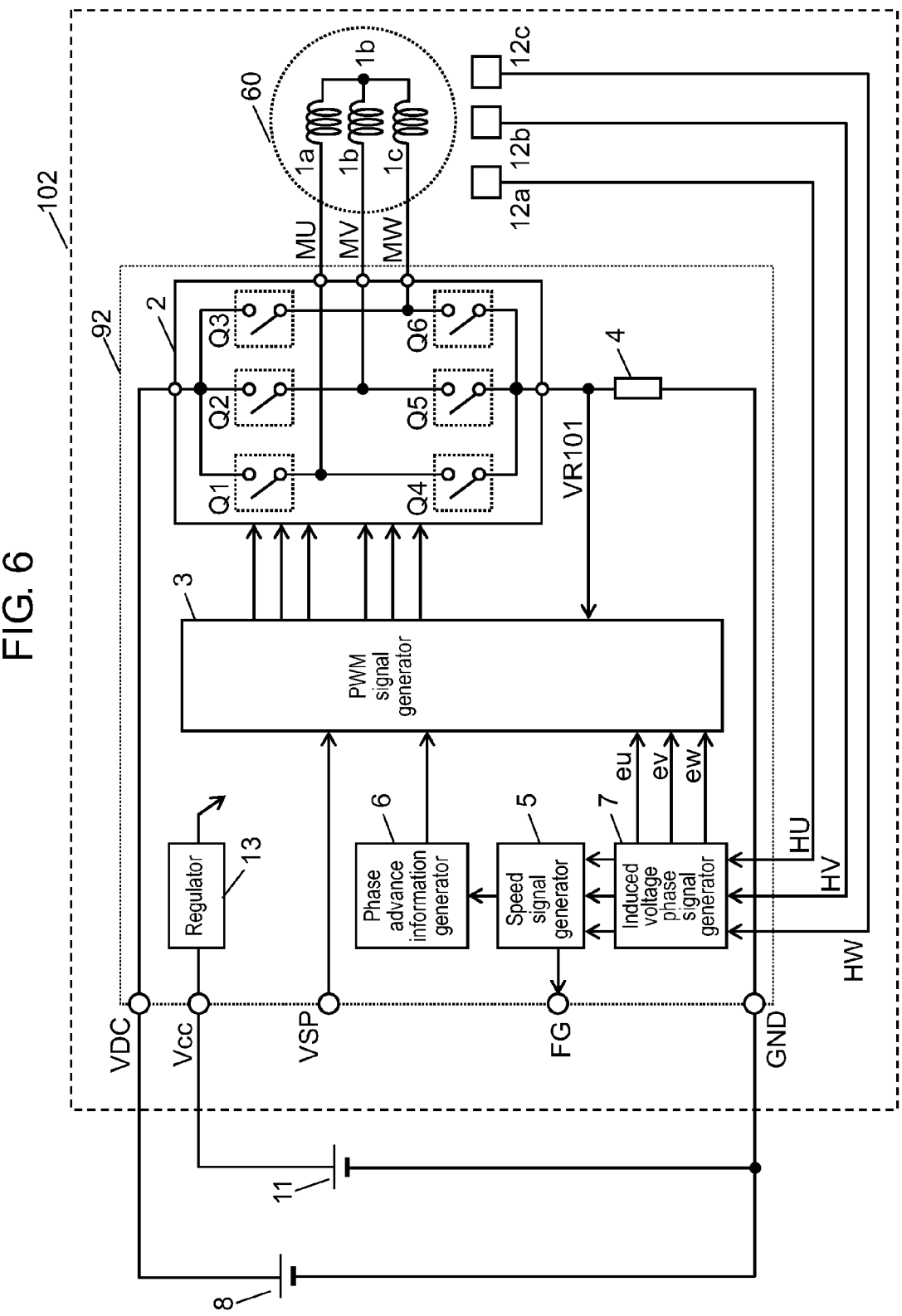
FIG. 6 is a block diagram illustrating the configuration of a brushless motor including a motor drive device according to the second exemplary embodiment of the present invention.

FIG. 6 is a block diagram illustrating the configuration of brushless motor 102 including motor drive device 92 according to the second exemplary embodiment of the present invention. As shown in FIG. 6, this embodiment has induced voltage phase signal generator 7 newly provided in motor drive device 92. This induced voltage phase signal generator 7 receives input of rotor magnetic pole position signals HU, HV, and HW from magnetic sensors 12a, 12b, and 12c provided near the rotor of motor 60. Then, induced voltage phase signal generator 7 generates induced voltage phase signals eu, ev, and ew according to rotor magnetic pole position signals HU, HV, and HW, and provides them to PWM signal generator 3 and transmits rotor magnetic pole position signals HU, HV, and HW to speed signal generator 5.

In this embodiment, speed signal generator 5 generates a rotation speed signal that indicates actual rotation speed of the rotor of motor 60 using rotor magnetic pole position signals HU, HV, and HW, and provides them to phase advance information generator 6. Phase advance information generator 6 extracts an advance angle value preliminarily set by rotation speed according to speed indicated by a rotation speed signal, and provides the extracted advance angle value to PWM signal generator 3.

PWM signal generator 3 acts on power switch unit 2 so as to advance the phase of voltage applied to first coil 1a, second coil 1b, and third coil 1c according to an advance angle value from phase advance information generator 6 with reference to the phases of induced voltage phase signals eu, ev, and ew. In this embodiment, such a configuration generates a rotation speed signal with the aid of rotor magnetic pole position signals HU, HV, and HW, and electrically drives the respective coils with applied voltage having a phase corresponding to speed indicated by the rotation speed signal.

Figure 7:
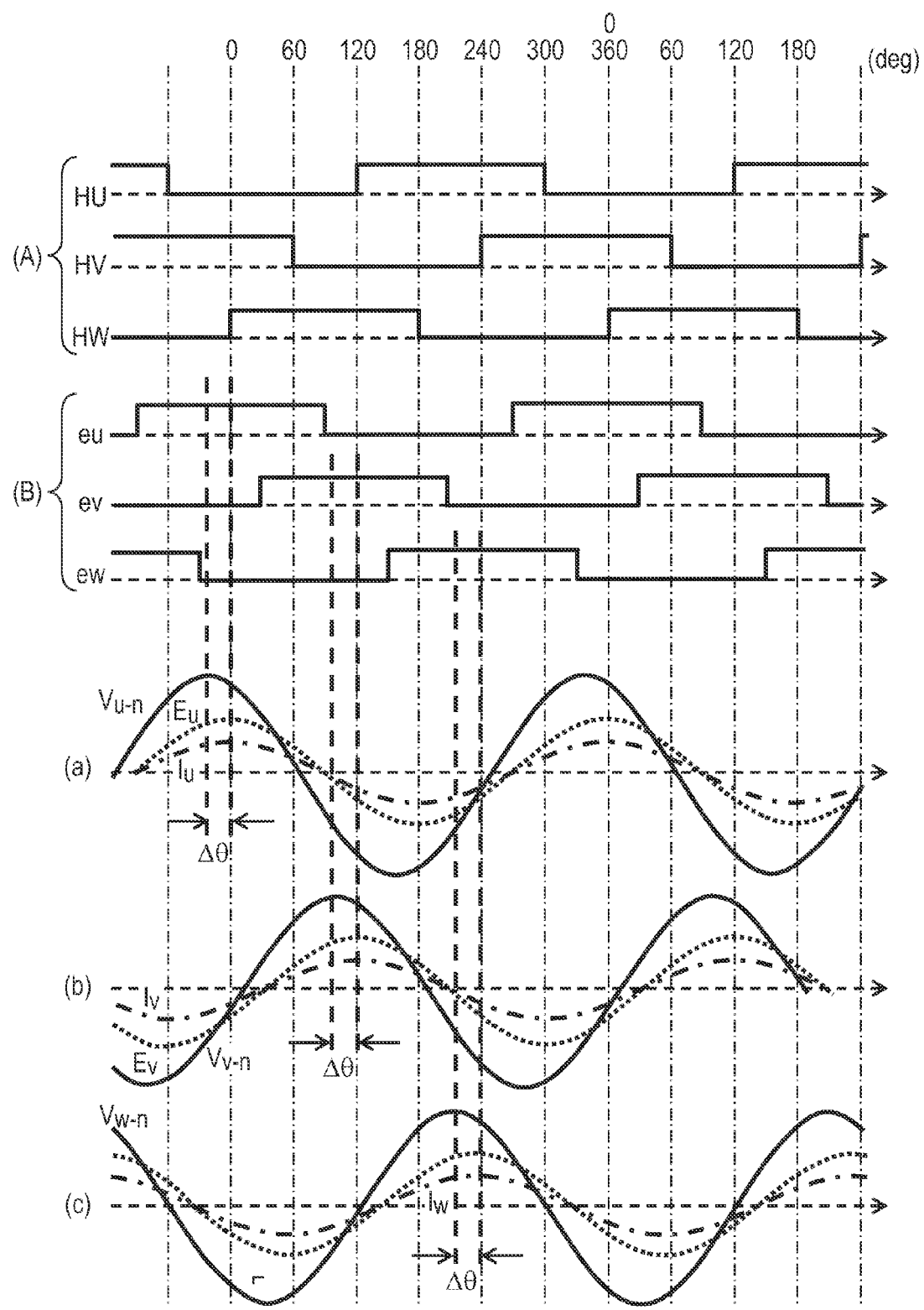
FIG. 7 illustrates operation of the motor drive device of the brushless motor.

FIG. 7 illustrates phase relationship of each signal in the second exemplary embodiment. Part (A) of FIG. 7 shows rotor magnetic pole position signals HU, HV, and HW from magnetic sensors 12a, 12b, and 12c. Part (B) of FIG. 7 shows induced voltage phase signals eu, ev, and ew generated by induced voltage phase signal generator 7. Part (a) of FIG. 7 shows induced voltage Eu generated in first coil 1a, applied voltage Vu-n, and coil current Iu. Part (b) of FIG. 7 shows induced voltage Ev generated in second coil 1b, applied voltage Vv-n, and coil current Iv. Part (c) of FIG. 7 shows phase relationship between induced voltage Ew generated in third coil 1c, applied voltage Vw-n, and coil current Iw.

Induced voltage phase signal generator 7 generates induced voltage phase signals eu, ev, and ew as shown in part (B) of FIG. 7 according to rotor magnetic pole position signals HU, HV, and HW from magnetic sensors 12a, 12b, and 12c. Coils 1a, 1b, and 1c receive input of applied voltages Vu-n, Vv-n, and Vw-n that have phases advanced by advance angle value Δθ with reference to the phases of induced voltage phase signals eu, ev, and ew. Consequently, the phases of induced voltage Eu and coil current Iu are matched with each other, so are induced voltage Ev and coil current Iv, and induced voltage Ew and coil current Iw. Note that FIG. 7 shows an example where the center of the period during which the induced voltage phase signal is at a high level is a reference phase. Advance angle value Δθ increases proportionally to the square of rotation speed N; however, the operation is the same as that in the first embodiment, and thus the subsequent descriptions are omitted.

In this embodiment, a magnetic sensor is used to obtain a rotor magnetic pole position signal of a brushless motor. Instead of the magnetic sensor as in the first embodiment, a rotor magnetic pole position signal of a brushless motor may be obtained from induced voltage, a current value, and a current direction of the coils.

Third Exemplary Embodiment

Figure 8:
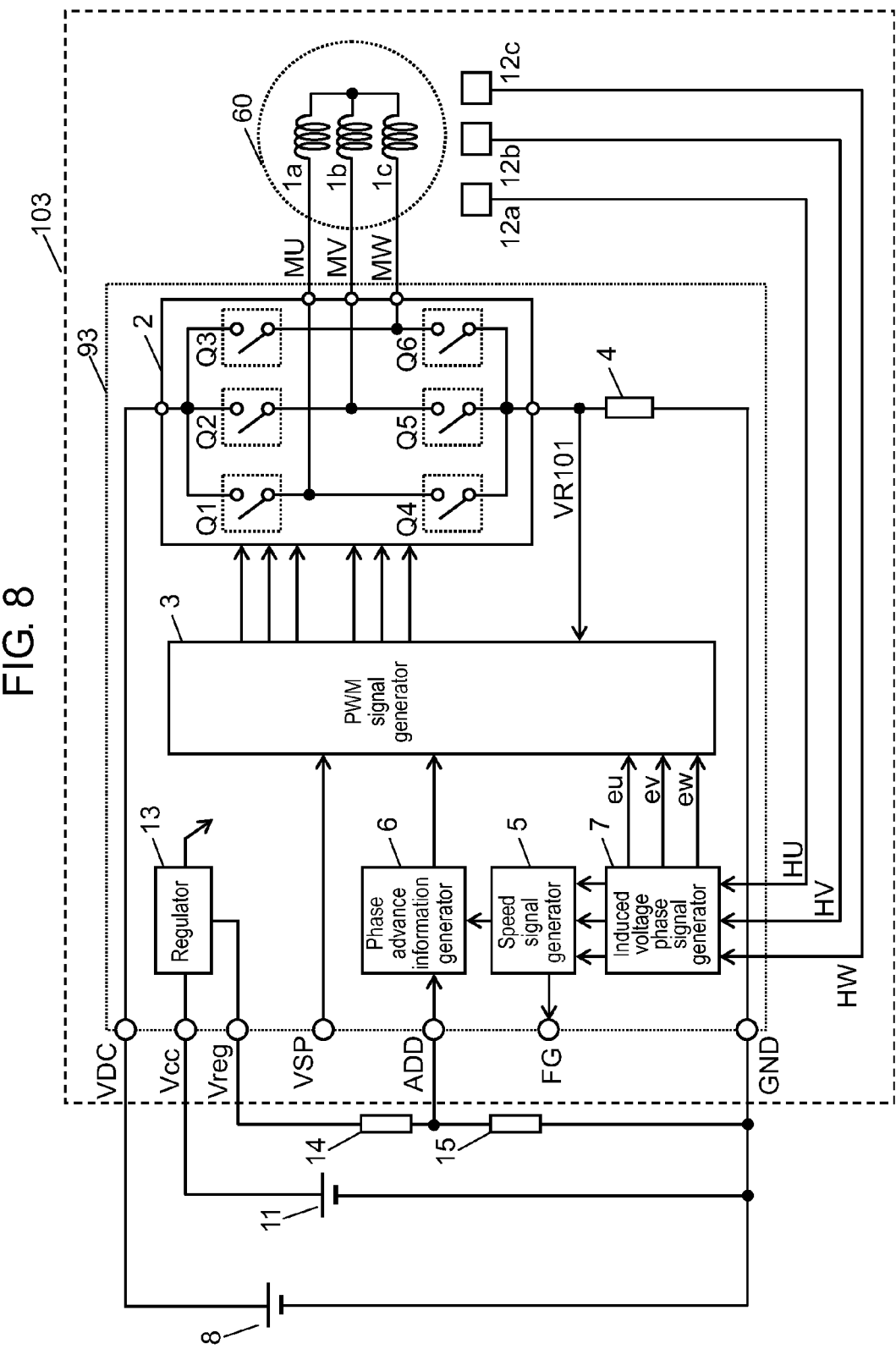
FIG. 8 is a block diagram illustrating the configuration of a brushless motor including a motor drive device according to the third exemplary embodiment of the present invention.

FIG. 8 is a block diagram illustrating the configuration of brushless motor 103 including motor drive device 93 according to the third exemplary embodiment of the present invention. In FIG. 8, phase advance information generator 6 is provided with terminal ADD as an external input terminal, and this terminal receives input of voltage obtained by dividing output voltage Vreg from regulator 13 with first resistance 14 and second resistance 15. Phase advance information generator 6 is configured to be able to change advance angle value Δθ by multiplying advance angle value Δθ by a certain ratio that is a predetermined factor according to a voltage value at terminal ADD.

Figure 9:
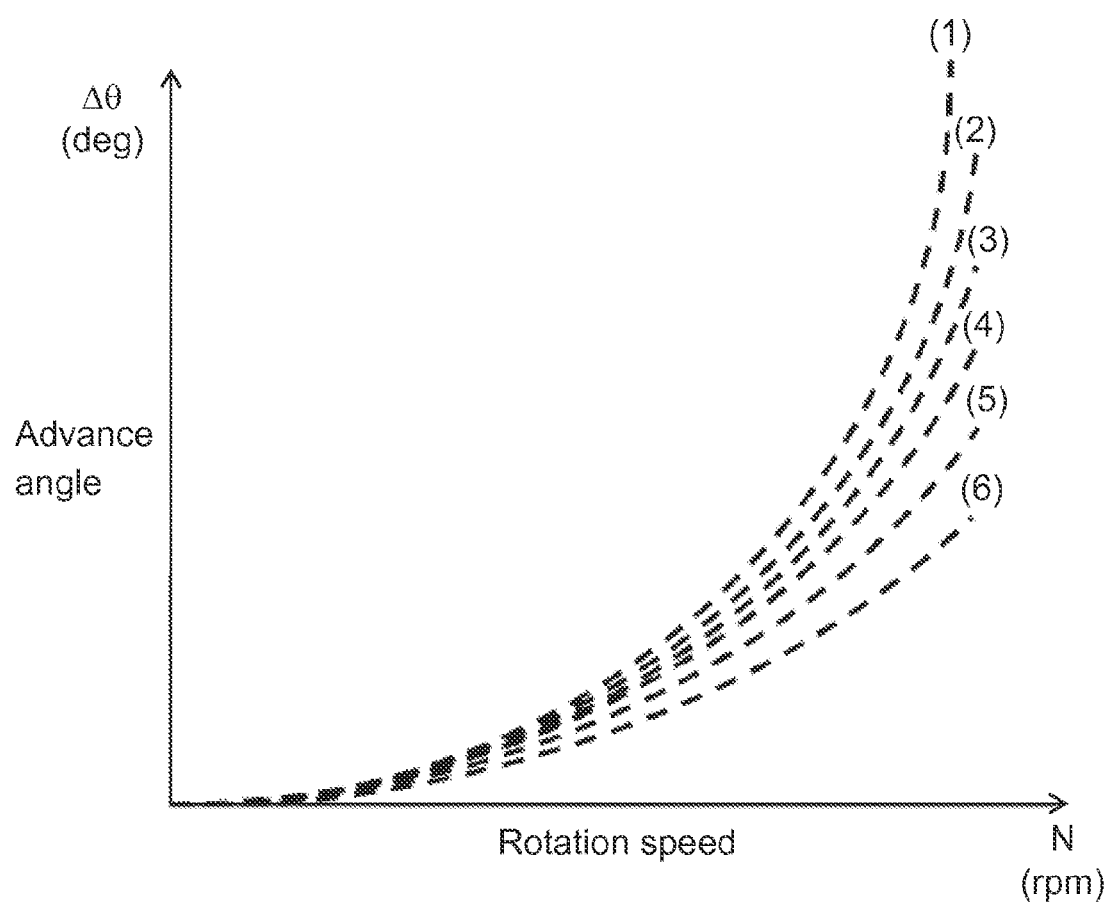
FIG. 9 illustrates operation of the motor drive device of the brushless motor.

FIG. 9 shows that the ratio of advance angle value Δθ is changed according to an input voltage value at terminal ADD, and Δθ is selectable as shown by the Δθ curves (1), (2), (3), (4), (5), and (6). The curves are continuous in FIG. 9; however, it may be of an approximate polygonal line.

Fourth Exemplary Embodiment

Figure 10:
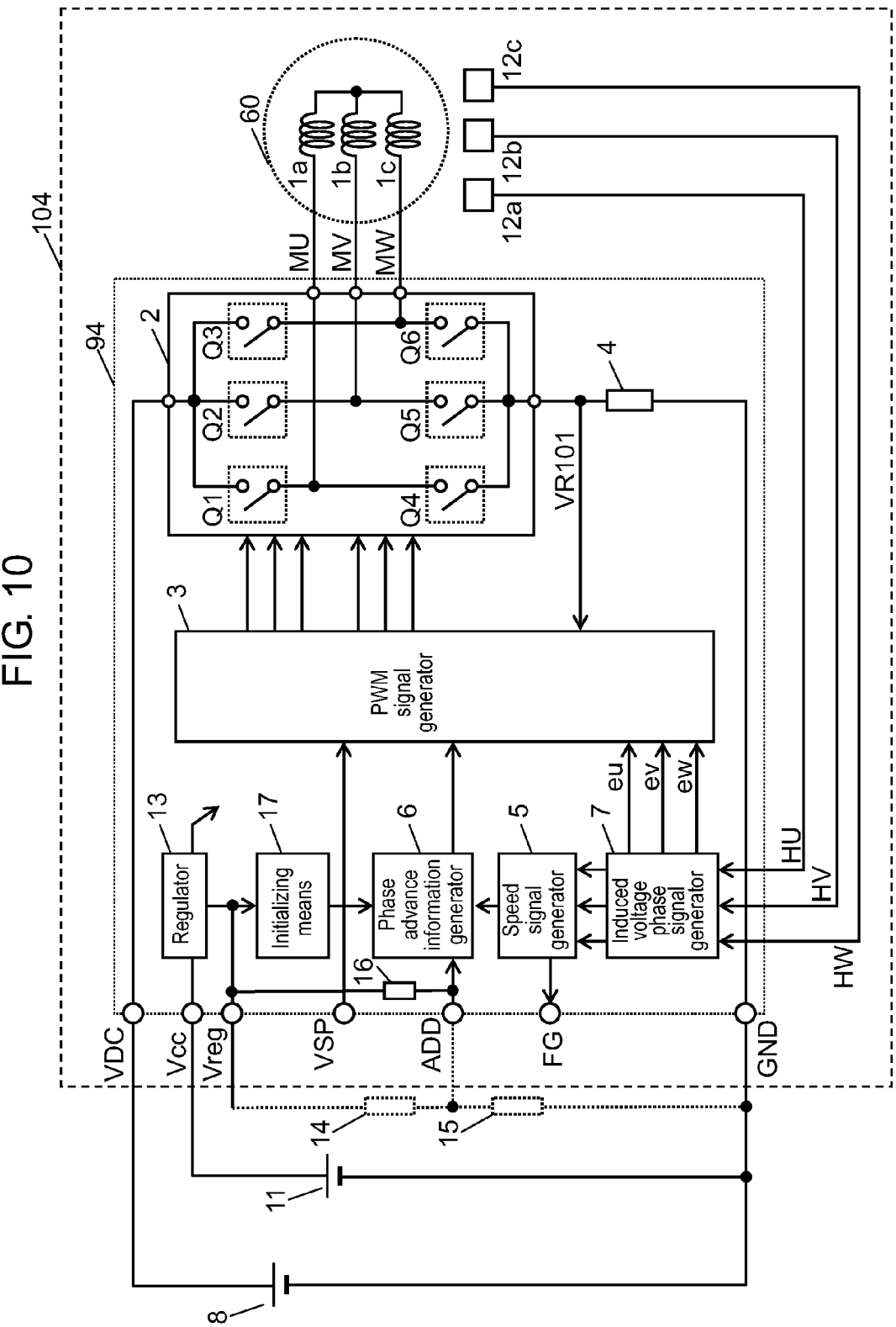
FIG. 10 is a block diagram illustrating the configuration of a brushless motor including a motor drive device according to the fourth exemplary embodiment of the present invention.

FIG. 10 is a block diagram illustrating the configuration of brushless motor 104 including motor drive device 94 according to the fourth exemplary embodiment of the present invention. In FIG. 10, the end of terminal ADD (external input terminal) closer to motor drive device 94 is provided with third resistance 16 having a high resistance value in the range between several ten kiloohms and several hundred kiloohms to pull up the voltage at the point to regulator output voltage Vreg, and is provided with initializing means 17. When the output voltage from regulator 13 reaches a given value when control power supply 11 starts up, initializing means 17 acts on phase advance information generator 6 so as to select a advance angle value Δθ curve that fits the terminal voltage of terminal ADD.

Figure 11:
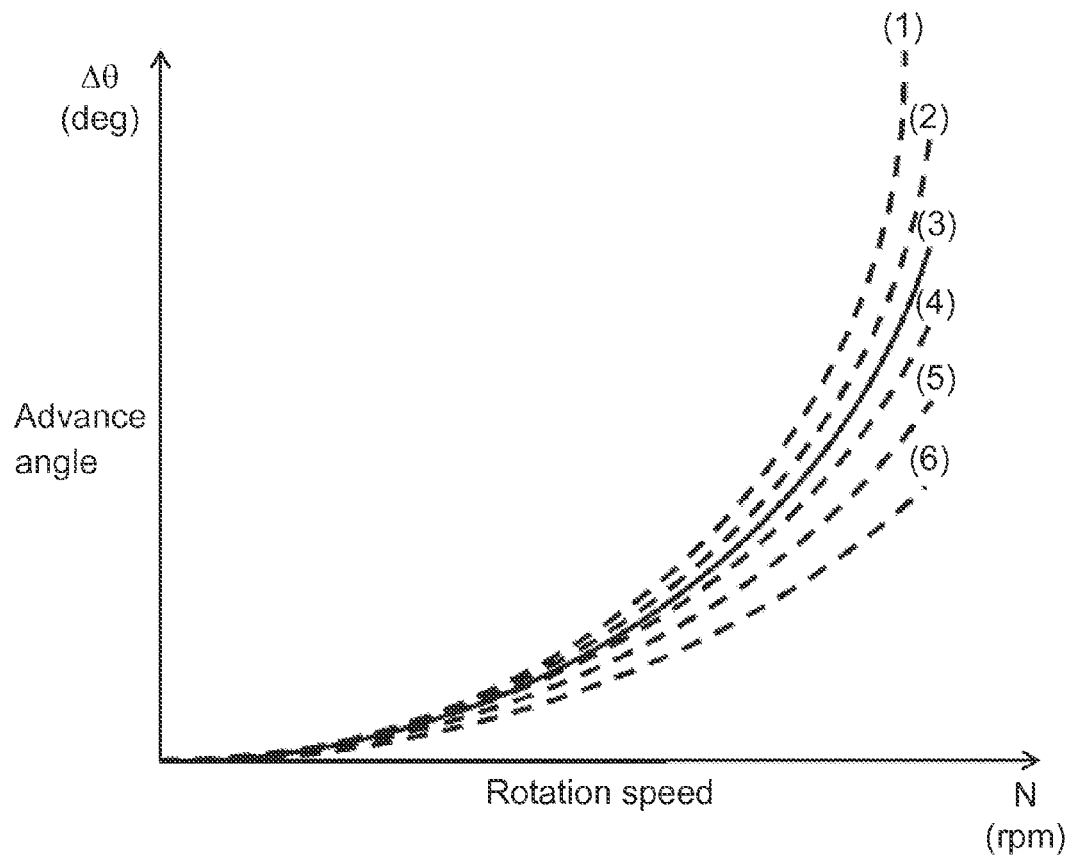
FIG. 11 illustrates operation of the motor drive device of the brushless motor.

FIG. 11 shows Δθ curves (1), (2), (3), (4), (5), and (6) selectable according to the terminal input voltage at terminal ADD. Without first resistance 14 and second resistance 15 provided outside terminal ADD, third resistance 16 inside terminal ADD brings the terminal ADD voltage to output voltage Vreg from regulator 13. For the terminal ADD voltage of Vreg, phase advance information generator 6 selects solid-line curve (3) in FIG. 11. This selection is made when the output voltage from regulator 13 reaches a given value when control power supply 11 starts up. From then on, the selected value is retained until control power supply 11 is interrupted and is immune to noise from terminal ADD.

For the advance angle value Δθ curve selected according to third resistance 16 inside terminal ADD, without first resistance 14 and second resistance 15 provided outside terminal ADD, a frequently used curve is preliminarily set.

Here, with first resistance 14 and second resistance 15 provided outside terminal ADD, as a result that the resistance values of first resistance 14 and second resistance 15 are in the range between several hundred ohms and several kiloohms, the voltage due to first resistance 14 and second resistance 15 precedes the voltage due to third resistance 16 inside terminal ADD.

Fifth Exemplary Embodiment

A description is made of brushless motor 100 including motor drive device 90 according to one of the above-described embodiments first through fourth and of an air conditioner using FIGS. 12 through 15. Here, motor drive device 90 is one of motor drive devices 91, 92, 93, and 94; brushless motor 100 is one of brushless motors 101, 102, 103, and 104.

Figure 12:
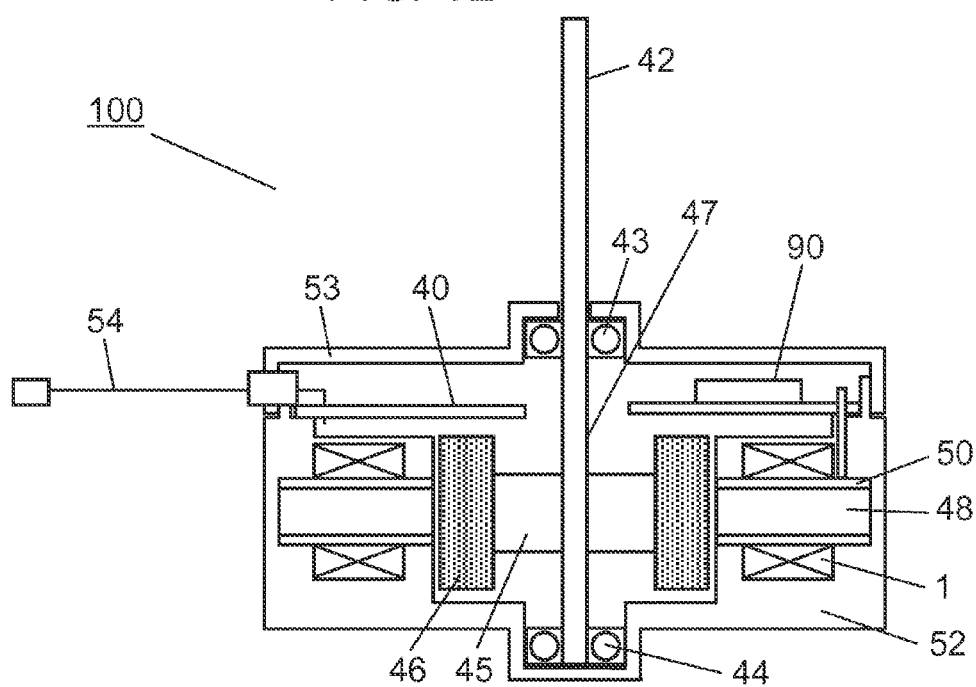
FIG. 12 is a block diagram of a brushless motor incorporating a motor drive device of the present invention.

FIG. 12 is a block diagram of brushless motor 100 with built-in motor drive device 90. In FIG. 12, stator 48 wound with coil 1 through insulator 50 is molded with resin to form mold assembly 52. Yoke 45 with permanent magnet 46 provided on its outer circumference and shaft 42 are joined together to form rotor assembly 47. Shaft 42 is borne by first and second ball bearings 43 and 44. Rotor assembly 47 is set to mold assembly 52; printed wiring board 40 with motor drive device 90 mounted thereon is further placed; and lidded with bracket 53. Lead wire 54 is led out from printed wiring board 40.

Figure 13:
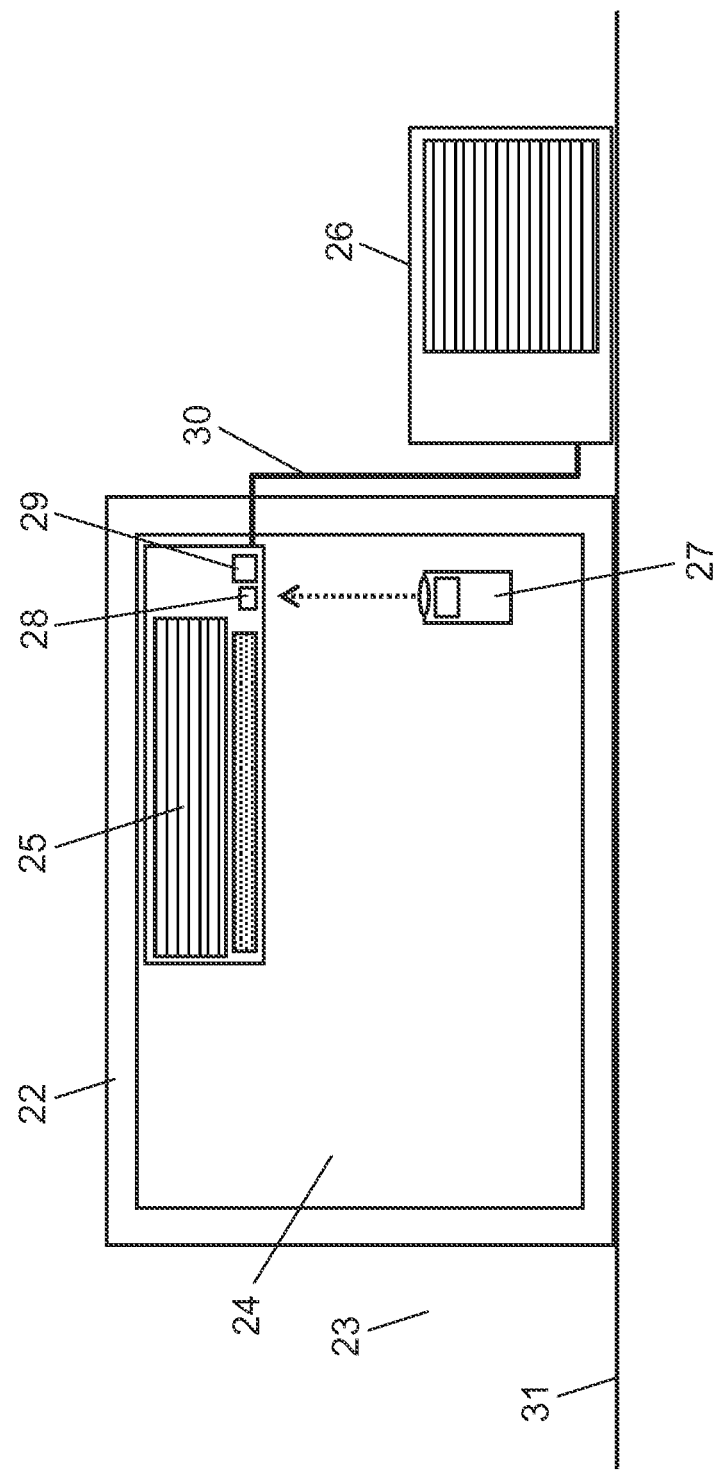
FIG. 13 is a block diagram of an air conditioner including a brushless motor having a motor drive device of the present invention.

FIG. 13 is a general view of an air conditioner. In FIG. 13, indoor unit 25 is provided at indoors 24 of house 22 on ground 31; outdoor unit 26 is provided at outdoors 23 on ground 31; and indoor unit 25 and outdoor unit 26 are connected to each other with piping 30. Indoor unit 25 has light receiving unit 28 and display unit 29, and light receiving unit 28 receives a signal from remote control 27 to change display on display unit 29.

Figure 14:
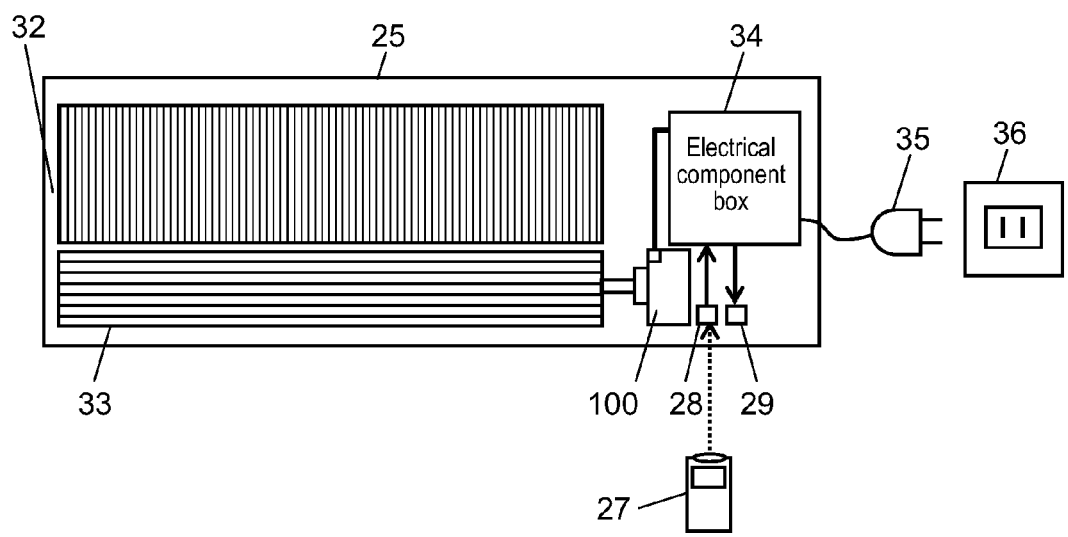
FIG. 14 is a block diagram of the indoor unit of the air conditioner.

FIG. 14 shows the configuration of indoor unit 25. In FIG. 14, indoor unit 25 includes cross-flow fan 33 underneath heat exchanger 32, and brushless motor 100 containing motor drive device 90 with its shaft joined to cross-flow fan 33 and electrically connected to electrical component box 34. Electrical component box 34 is supplied with power from AC wall outlet 36 through AC plug 35. Operating remote control 27 causes an operation instruction signal to be transmitted; the signal is transmitted to electrical component box 34 through light receiving unit 28; and electrical component box 34 acts on display unit 29 to change the display and to operate brushless motor 100.

Figure 15:
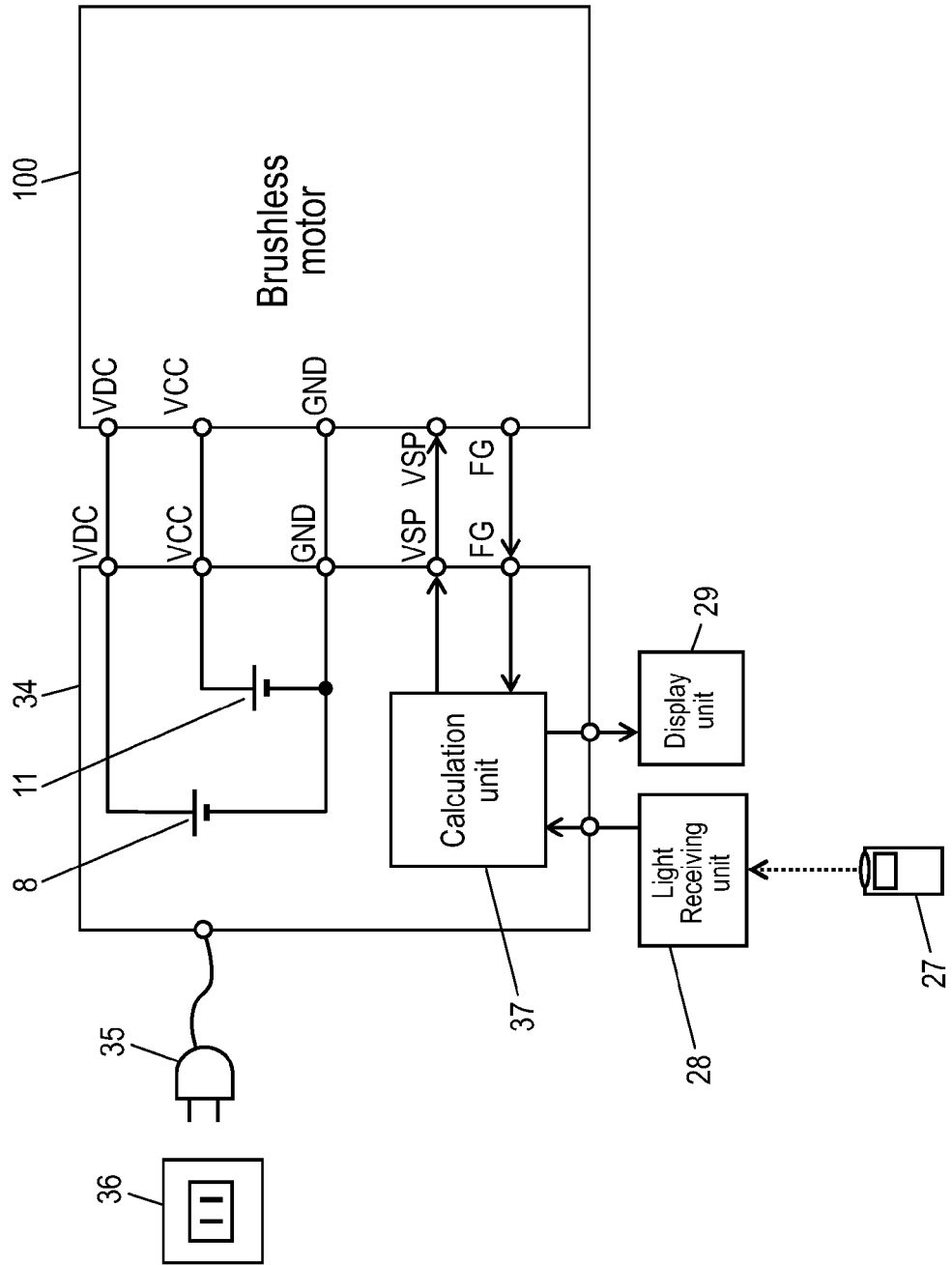
FIG. 15 is a connection diagram of the electrical component board of the indoor unit.

FIG. 15 is a connection diagram between electrical component box 34 and brushless motor 100. In FIG. 15, commercial AC voltage input from AC wall outlet 36 to electrical component box 34 through AC plug 35 is converted to DC in electrical component box 34 to become output of DC power supply 8 and control power supply 11, and they are supplied to brushless motor 100 through terminals Vdc, Vcc, and GND.

A signal from remote control 27 is transmitted to calculation unit 37 through light receiving unit 28. Calculation unit 37 acts on display unit 29 to perform display fitting the received signal and generates a motor operation signal (VSP signal) at terminal VSP. Brushless motor 100 operates according to the VSP signal.

Brushless motor 100 operates to generate a signal (FG signal) indicating the rotation speed at terminal FG. Calculation unit 37 receives input of the FG signal to change the VSP signal according to the FG signal and controls rotation speed of brushless motor 100.

As a result that brushless motor 100 increases its rotation speed, advance angle value Δθ increases in a shape of a load characteristic curve to advance the phase of coil-applied voltage from the induced voltage phase, resulting in the coil current phase well matching the induced voltage phase. Thus, brushless motor 100 generates torque efficiently.

As shown in the structural drawing of FIG. 14, the main source of power consumption of indoor unit 25 is the brushless motor for the blowing fan, and thus increasing the efficiency of the brushless motor contributes to reducing the power consumption of the air conditioner to a large degree.

INDUSTRIAL APPLICABILITY

A motor drive device of the present invention is an optimal device for increasing the efficiency of a motor and is useful for saving energy of equipment, and thus applicable to various types of electrical equipment incorporating a motor.

The invention claimed is:
1. A motor drive device including a power switch unit for supplying power to multi-phase coils of a motor, and a control unit for on-off controlling the power switch unit, the control unit including:
    a speed signal generator that generates a rotation speed signal indicating rotation speed;
    a PWM signal generator that acts on the power switch unit to control the power switch unit so as to generate a coil-applied voltage; and
    a phase advance information generator that has a preset phase advance amount of the coil-applied voltage corresponding to given speed according to load characteristics of the motor,
    wherein the phase advance information generator sets the phase advance amount by using a polygonal line that approximates a load characteristic curve of the motor,
    wherein the motor drive device applies a voltage to the multi-phase coils according to a phase advance signal from the phase advance information generator.

2. The motor drive device of claim 1, wherein the phase advance amount is set so that an induced voltage of the coils and a coil current match in phases.

3. The motor drive device of claim 1, wherein the polygonal line that approximates the load characteristic curve includes two points of division.

4. The motor drive device of claim 1, wherein the phase advance information generator has an external input terminal, and the phase advance amount is multiplied by a certain ratio according to an externally input signal.

5. The motor drive device of claim 4, wherein, when an externally input signal is not present, the phase advance amount is multiplied by another certain ratio, and when an externally input signal is present, the phase advance amount is multiplied by the certain ratio according to the externally input signal.

6. A brushless motor including the motor drive device of claim 1.

7. An air conditioner including the brushless motor of claim 6.

8. The motor drive device of claim 2, wherein the phase advance information generator has an external input terminal, and the phase advance amount is multiplied by a certain ratio according to any externally input signal.

9. The motor drive device of claim 3, wherein the phase advance information generator has an external input terminal, and the phase advance amount is multiplied by a certain ratio according to an externally input signal.

* * * * *